July 22, 1969      R. FIGA      3,457,398

FLASHLIGHT WITH REPLACEABLE BATTERY

Filed March 14, 1966

*INVENTOR.*
Rubin Figa by *Erwin Koppel*

ATTORNEY.

__United States Patent Office__

3,457,398
Patented July 22, 1969

3,457,398
FLASHLIGHT WITH REPLACEABLE BATTERY
Rubin Figa, 4 Bryant Crescent,
White Plains, N.Y. 10605
Filed Mar. 14, 1966, Ser. No. 534,080
Int. Cl. F21d 7/00
U.S. Cl. 240—10.68                                            1 Claim

ABSTRACT OF THE DISCLOSURE

A flashlight having a front light bulb portion connected to a battery portion. The battery portion having front and rear battery units in series. The battery units having an inner metal container surrounded by an outer insulating layer. The insulating layer of the rear battery unit terminates flush with the bottom edge of the metal container. A thin metal covering is carried over the insulating layers and is bent over the rear surface of the insulating layer of the rear battery unit to establish contact with the metal container forming an electrical circuit.

---

This invention relates to an improved battery and is particularly concerned with the incorporation of the improved battery in a flashlight.

In a conventional flashlight using conventional batteries a metal housing is provided for the batteries, and a switch or other means is included in an electrical circuit to enable the light bulb to be turned on or off.

It is an object of the present invention to provide a battery which includes an outside metal layer to obviate the need for a separate housing.

It is another object of the present invention to provide an improved flashlight in which the battery means is specially formed to obviate the need for a separate battery housing and switch.

It is a further object of the present invention to provide a flashlight having a plurality of batteries formed with outside metal layers to obviate the need for a separate housing and switch.

It is still another object of the present invention to provide a flashlight having a battery means without a separate housing and switch, and such battery means is completely replaceable when exhausted by a fresh integral unit.

It is a still further object of the present invention to provide a flashlight having a battery means without a separate housing and switch that is inexpensive, easily manufactured, easily operable and completely replaceable as an integral unit.

These and other objects will be apparent from the following description when read in connection with the drawings, in which.

Figure 1:
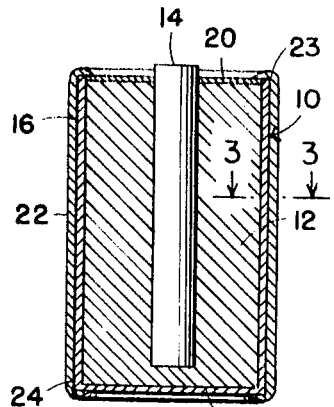
FIG. 1 is a view in cross-section of a conventional battery in the prior art.

In FIG. 1 a conventional battery is shown comprising the usual zinc container 10 which holds electrolytic material 12. In the center of the electrolyte material is a carbon rod 14, and a resultant chemical reaction takes place to produce an electric current when the battery is placed in a complete circuit.

Container 10 comprises a cylindrical shell 16 to which is attached a bottom metal plate 18. At the top of the battery is an upper plate 20 made of insulating material, and this completes the enclosure for the electrolytic material 12. Formed around the outside of cylinder 16 is an outer insulating layer 22, usually a paper material, and this insulating material 22 is bent over the upper edge and lower plates 18 and 20 at upper edge 23 and lower edge 24, respectively, so that the metal container 10 will not contact the housing of a flashlight when it is placed therein. In the conventional flashlight a metal spring inside the end of the housing makes contact with the lower plate 18, and the complete circuit is effected by means of the housing through a switch to a light bulb in contact with carbon rod 14. Thus it is seen that in the prior art it is necessary to have a metal housing, rear metal spring and switch to provide an operable flashlight. And if it were attempted to eliminate the switch or have the switch left in the "on" position, it would then be necessary to make or break the circuit such as by screwing the light bulb into and out of contact with the carbon rod.

Figure 2:
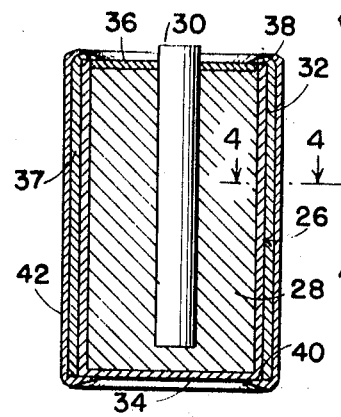
FIG. 2 is a view similar to FIG. 1 showing the novel battery of the present invention.

In the present invention the prior art complexities and difficulties are overcome by the novel battery illustrated. In FIG. 2 the novel battery has a zinc container 26 for the electrolytic material 28, and a carbon rod 30 is positioned in the center thereof in a manner similar to the battery of FIG. 1. Container 26 comprises a cylindrical shell 32 to which is attached a lower plate 34. At the top of the novel battery is an insulating plate 36 to complete the enclosure of the electrolytic material 28. Formed around the outside of cylinder 32 is an outer insulating layer 37. At the top edge 38 of container 26 the insulating layer 37 is bent over in a manner similar to FIG. 1. However, an important feature of the invention is that at lower edge 40 of container 26 the insulating layer 37 has its lower edge flush therewith on a plane passing through the lower plate 34. In other words, the insulating layer 37 does not bend over the lower edge of container 26 as was done in the prior art.

Figure 3:
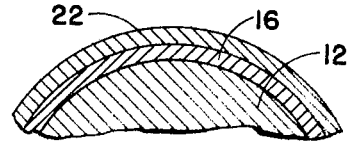
FIG. 3 is a view taken along section line III—III of FIG. 1.
Figure 4:
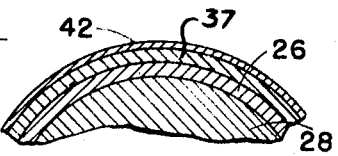
FIG. 4 is a view taken along section line IV—IV of FIG. 2.

An electrically conducting layer 42 is formed around the insulating layer 37. This conducting layer can be quite thin, such as metal foil, since its primary purpose is merely to conduct electrical current. The thickness of layer 42 is exaggerated in FIG. 2 for clarity. Accordingly, it is seen that the novel battery of FIG. 2 has a circuit path that extends from container 26 at edge 40 through the conducting layer 42. FIGS. 3 and 4 illustrate the layer arrangement in these circular batteries.

Figure 5:
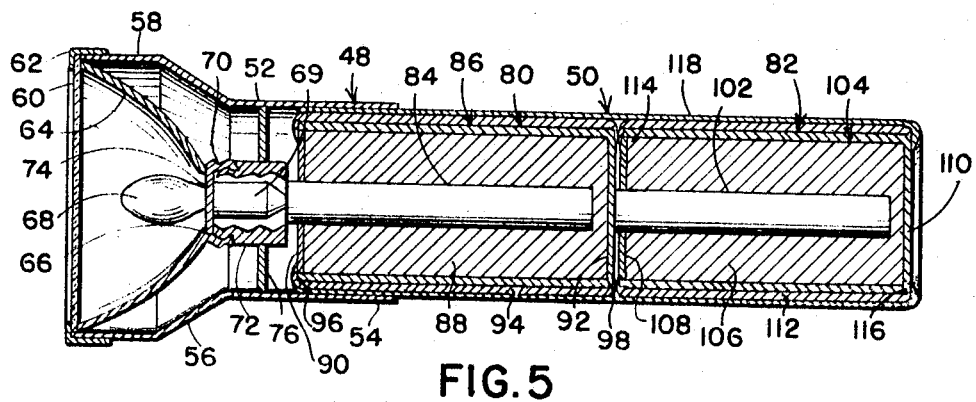
FIG. 5 is a view in cross-section showing the incorporation of the improved battery in a flashlight.

FIG. 5 illustrates the use of the novel battery in a two cell flashlight. A conventional flashlight battery has 1.5 volts, and two of such batteries connected in series will provide 3 volts to adequately light the conventional flashlight bulb. In the particular embodiment of FIG. 5 the novel battery of FIG. 2 is connected in series with a conventional battery of FIG. 1, both batteries being 1.5 volts.

Figure 6:
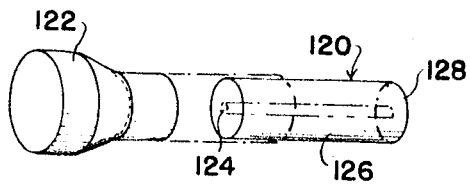
FIG. 6 is a view of the flashlight in separated condition with a modification of the novel battery and showing the replaceability feature of the battery means.

Flashlight 46 comprises a light bulb section 48 and a battery section 50. The two sections are shown in telescopic relation, and FIG. 6 illustrates the separation of the two sections. Although a telescopic connection is shown, the invention is not to be limited thereto, as a thread or screw connection is possible as well as a splined relationship. It is only necessary that the two sections be easily detachable to practice the invention.

Light bulb section 48 comprises an outer metal housing 52 with its rearward portion 54 having a diameter of a size to form a tight fit over the battery section 50. Portion 54 extends forward to form a portion 56 that is flared outwardly at a constant taper. Portion 56 then extends forward at constant diameter to form cylindrical portion 58. A transparent glass disk 60 is positioned at the front end of cylinder 58, and an annular cap 62 lips over the edge of glass disk 60 to hold the glass in place. Cap 62 can be threaded or clamped on cylinder 58. Positioned within portions 58 and 56 is a reflector 64. Reflector 64 has a hollow frusto-conical shape with its greater outer diameter abutting the edge of glass disk 60. Reflector 64 then tapers inwardly to its smaller diameter opening 66 in which light bulb 68 is located. Reflector 64 has a conventional shiny surface facing forwardly to reflect light rays, and it further has a rearward threaded extension 70 to receive a correspondingly threaded light bulb holder 72. The light bulb 68 includes a base portion 69 and an extending disk 74 at an intermediate area that is larger than opening 66 so it presses thereagainst. Holder 72 is then threaded in place behind disk 74 to hold the bulb in place. A support in the form of an annular ring member 76 is fitted with its internal diameter abutting holder 72 and its outer diameter abutting housing 54.

Battery section 50 is an integral unit comprising conventional front battery 80 and novel rear battery 82. Battery 80 includes carbon rod 84, container 86 for electrolyte 88, and upper insulating plate 90. Container 86 includes lower plate 92, and around container 86 is formed an insulating layer 94 which is bent over container top edge 96 and container bottom edge 98 in a manner similar to the showing in FIG. 1. Battery 82 includes carbon rod 102, container 104 for electrolyte 106 and upper plate 108. Container 104 includes lower plate 110, and around container 104 is formed insulating layer 112. As in FIG. 2, the insulating layer 112 is bent over container top edge 114 and is flush with container lower edge 116.

Surrounding both batteries 80 and 82 is a metal layer 118. In the embodiment of FIG. 5 the layer 118 acts both to conduct electricity and also to form a support to maintain the two batteries in an integral end-to-end series connected unit wherein the end of carbon rod 102 abuts lower plate 92. At the one end of battery 80 it will be seen that layer 118 is flush with upper plate 90 so that insulating layer 94 extends therebeyond to bend over and insulate edge 96. At the other end of battery 82 layer 118 bends around the edge of layer 112 and edge 116 to be in contact with lower plate 110. Accordingly, it is seen that integral unit 50 includes two batteries in series in which a current path is through the two batteries 80, 82, metal plate 110 and metal layer 118.

When it is desired to energize bulb 68, the bulb portion 52 is telescopically slid over outer layer 118 to the position shown in FIG. 5 until the base 69 of the bulb contacts carbon rod 84. The current path from layer 118 now extends through metal housing 52, reflector 64 and bulb 68 to complete the circuit to carbon rod 84. Housing 52 is formed to have a tight fit on layer 118 so it will remain in this FIG. 2 position until slid or twisted apart to break the circuit. A positive lock could be formed by a screw thread, protuberance or raised detent in either housing 52 or layer 118 with a corresponding depression in the other to remain engaged in the FIG. 2 position until hand pressure detaches the two sections.

FIG. 6 illustrates a modification of the battery means for a two cell flashlight wherein a single novel battery 120 is provided with a capacity of 3 volts. Bulb portion 122 is the same at portion 52 in FIG. 5 and functions in the same manner. Battery 120 is a single unit as in the FIG. 2 illustration except that it is approximately twice the length. Battery 120 has a carbon rod 124 and further includes the container for the electrolyte as in FIG. 2. Around the container is the insulating layer as in FIG. 2, and around this layer is a thin metal layer 126 that is in electrical contact with a metal bottom plate 128. In the illustration of FIG. 6 the layer 126 does not provide any support function and therefore can be as thin as metal foil as long as it provides a conductive circuit path as in FIG. 2.

FIG. 6 represents the preferable embodiment of the novel flashlight and illustrates the "throw-away" feature of the invention. It is to be appreciated that battery portion 120 is equivalent to that part of a conventional flashlight comprising the housing, spring, switch and batteries. In a conventional flashlight when the batteries are exhausted, they are removed and replaced by fresh batteries. However, if the batteries have leaked or the switch malfunctions, the conventional flashlight is no longer usable. Moreover, the conventional flashlight is a comparatively expensive article because it requires the housing, spring and switch. In the present invention the complete function of the conventional housing, spring, switch and batteries is performed by the novel battery portion 120, and this is possible for the price of only the novel battery means. Accordingly, it is seen that the novel flashlight is considerably less expensive than a flashlight in the prior art. Moreover, the battery portion 120 can be thrown away when it is exhausted merely by separating from portion 122 as illustrated. The user then obtains a fresh battery portion 120, and the two sections are joined as shown by moving section 122 to the dotted line position on the fresh portion. Among other advantages the novel flashlight cannot be harmed if the battery leaks. It is to be further noted that the bulb is always tightly fixed in place in portion 48 or 122 and will light when the two portions are slid together.

Figures 7, 8:
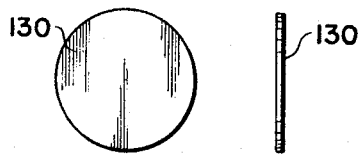
FIG. 7 is a plan view of an insulating disk for use in the present invention.
FIG. 8 is a side view of the insulating disk of FIG. 7.

FIGS. 7 and 8 illustrate an insulating disk 130 which is of a diameter less than the inside diameter of portion 54. It may be desired to keep the light bulb and battery portions in engaged position as in FIG. 5 for easy transport or storage, but it is not desired to have the light bulb energized. In such case the disk 130 is inserted between the bulb base and the abutting carbon rod. Thus, if desired in FIG. 5 the disk 130 would be inserted between base 69 and rod 84 to break the circuit.

The particular embodiments of the invention illustrated and described are to be considered illustrative only. The present invention includes such other modifications and equivalents as may readily occur to those skilled in the art, within the scope of the appended claim.

What I claim is:

1. A flashlight having a front light bulb portion engageable with a rear battery portion, said battery portion comprising at least two battery units positioned in series relation, the rear battery unit including a central carbon rod surrounded on its sides and rear end by electrolyte material and said electrolyte material enclosed within a cylindrical metal container, said container being surrounded by an insulating layer that is bent inwardly over the front edge surface of said metal container, said insulating layer having its rear edge surface terminating at a point abutting the rear outer edge surface of said metal container in a plane passing through both said edge surfaces, a thin metal covering formed on said insulating layer and bent inwardly over the rear edge surface of said insulating surface to establish contact with the rear surface of said container and form a continuous electrical conducting path therethrough, the front battery unit including a central carbon rod surrounded on its sides and rear end by electrolyte material and said electrolyte material enclosed within a cylindrical metal container, the rear surface of said front metal container being in contact with the front end of the carbon rod of the rear battery unit, said front metal container being surrounded by an insulating layer that is bent inwardly over the front and rear edge surfaces of said front metal container, said thin metal covering extending forward from said rear battery unit to surround the front insulating layer of said front battery unit, and said thin metal covering being bent inwardly over the front edge surface of said front battery unit, said thin metal covering thereby providing a complete electrical circuit through said series-positioned battery units when a light bulb in said front portion is engaged with the front end of the carbon rod of said front battery unit.

References Cited

UNITED STATES PATENTS 2,627,690 2/1953 Kniffer _____ 240—10.61 X
2,826,681 3/1958 Anthony et al. _____ 240—10.61

NORTON ANSHER, Primary Examiner

CHARLES E. SMITH, Assistant Examiner

U.S. Cl. X.R.

240—10.66